W. G. PANCOAST AND W. J. GROTENHUIS.
ATTACHING BRACKET.
APPLICATION FILED NOV. 1, 1920.

1,379,778.

Patented May 31, 1921.
2 SHEETS—SHEET 1.

Inventors,
William G. Pancoast, and
William J. Grotenhuis
By:

W. G. PANCOAST AND W. J. GROTENHUIS.
ATTACHING BRACKET.
APPLICATION FILED NOV. 1, 1920.
1,379,778.
Patented May 31, 1921.
2 SHEETS—SHEET 2.
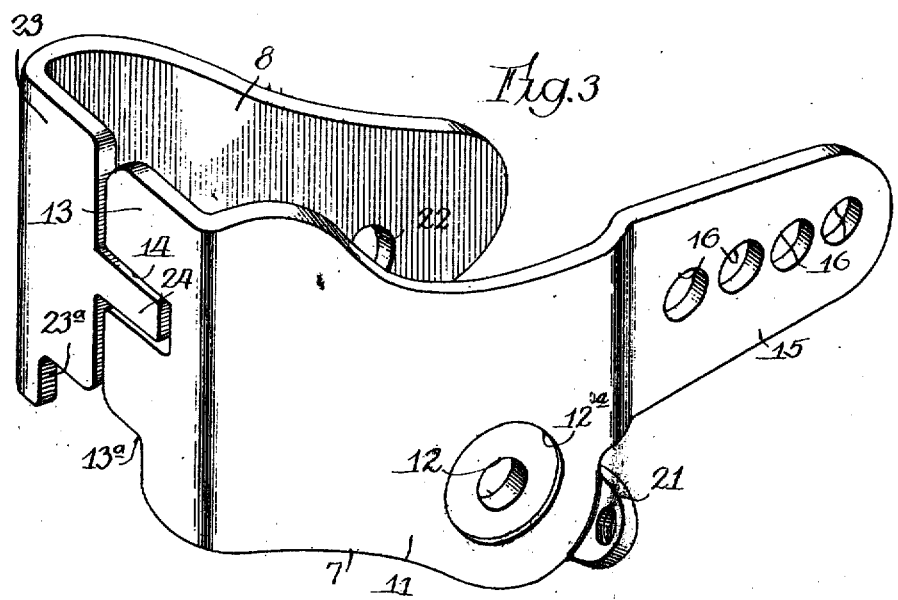
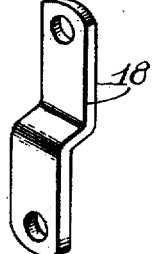
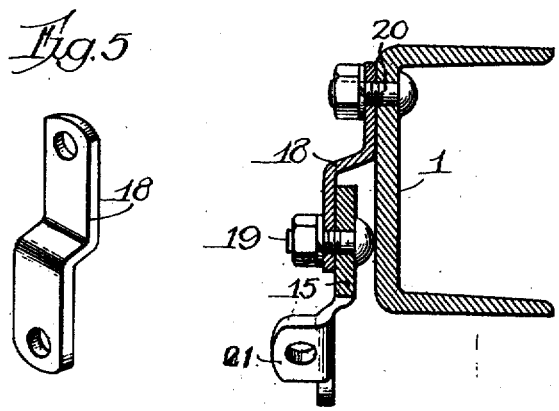
Inventors.
William G. Pancoast, and
William J. Grotenhuis,
By
Attys.

UNITED STATES PATENT OFFICE.

WILLIAM G. PANCOAST AND WILLIAM J. GROTENHUIS, OF CHICAGO, ILLINOIS, ASSIGNORS TO BIFLEX PRODUCTS COMPANY, OF WAUKEGAN, ILLINOIS, A CORPORATION OF ILLINOIS.

ATTACHING-BRACKET.

1,379,778.   Specification of Letters Patent.   Patented May 31, 1921.

Application filed November 1, 1920. Serial No. 421,197.

*To all whom it may concern:*

Be it known that we, WILLIAM G. PANCOAST and WILLIAM J. GROTENHUIS, both citizens of the United States, and residents of Chicago, in the county of Cook and State of Illinois, have invented certain new and useful Improvements in Attaching-Brackets, of which the following is a specification.

This invention relates to improvements in automobile bumpers and more particularly to devices for fastening bumpers to the frame of the vehicle and ordinarily termed attaching brackets.

In the designing of attaching brackets, it is desirable that they shall be capable of attachment to various dimensions of frame members, that is to say, so designed as to be readily adaptable to different makes of motor vehicles, and to thus avoid the necessity of providing specially shaped brackets to fit each make or several makes of vehicles.

The object of the present invention is therefore to provide a bracket so designed as to be readily applied to vehicle frames of substantially the same contour and dimensions, and moreover, to simplify the problem of bracket attachment and adjustment by the utilization of less complicated parts and by making use of structural features of the vehicle frame which are ordinarily overlooked in attaching bumpers.

The novel features of the invention are hereinafter fully pointed out and illustrated in the accompanying drawings, in which—

Figure 1:
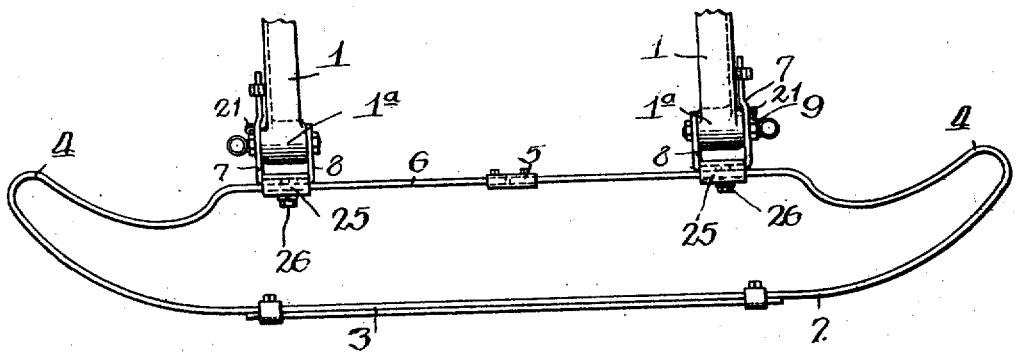
Figure 2:
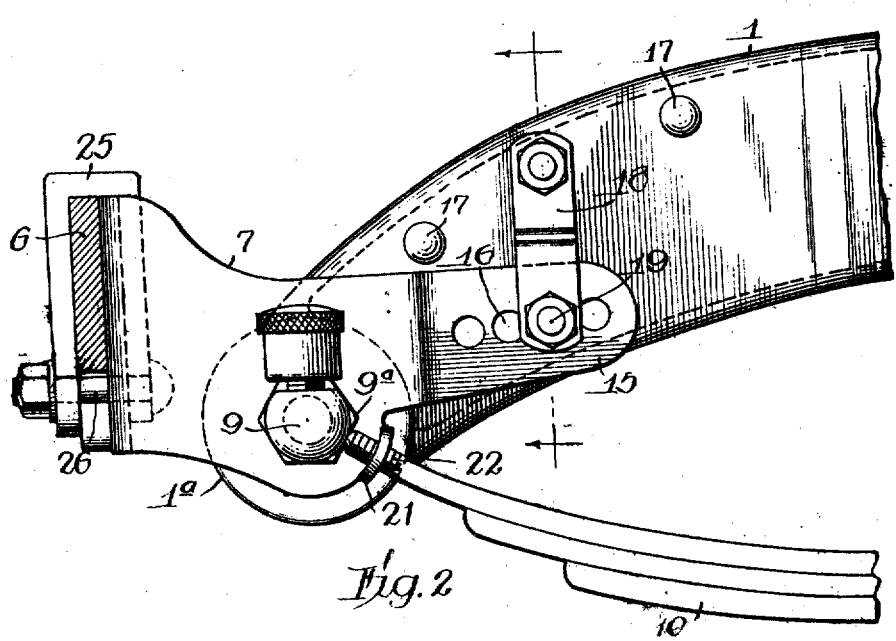

Figure 1 is a top plan view of a bumper as attached to the frame members of a vehicle, Fig. 2 is an enlarged detail view in side elevation of the attaching bracket mounted to the frame member, Fig. 3 is a perspective view of a complete bracket removed, Fig. 4 is a detail view in section, taken on line 4, 4 of Fig. 2, and Fig. 5 is a perspective view of the attaching link.

The attaching bracket embodying the features of the invention is adapted for attaching such a bumper as shown in Fig. 1 to the longitudinal frame members 1, 1 of a vehicle frame, the bumper 2 being preferably of the flexible or resilient type and consisting of a forward impact section 3, the extremities of the impact section being bent in U-shape to form the end sections 4, 4. As a preferred construction, the impact end sections are made from a continuous bar bent in the desired shape, the ends of the bar being extended inwardly from the end sections and connected together in abutting relation by means of a suitable clamp 5, the portions adjacent the clamp forming a rearwardly disposed bar 5 extending parallel to the impact section 3 and having direct connection with the attachment brackets in the manner hereinafter to be described.

Referring now to a single attaching bracket, the same comprises two companion plates 7 and 8 adapted to engage and to be clamped on opposite sides of the enlargements or heads 1ª, 1ª formed at the forward extremities of the frame members 1, 1, the primary means of attachment being the pivot bolt 9 which extends through the head 1ª and pivotally connects the forward spring 10 to the frame member 1.

The plate 7 preferably engages the outer side of the frame member 1 and is constructed in the following manner: By means of a stamping process a blank of sheet metal is stamped or formed into a body portion 11 adapted to lie flatwise against the side of the frame head 1ª and provided near its lower edge with a bolt hole 12 preferably surrounded by a countersunk depression 12ª. The forward portion of the body 11 is designed to project beyond the frame head 1ª and is provided at its forward edge with a vertically disposed and transversely extending flange 13, said flange having a cut-away portion 13ª at its lowermost corner. Extending inwardly from the inner vertical edge of the flange 13 is also provided a slot 14 terminating a short distance from the body 11 and adapted to serve a purpose hereinafter more fully described. The rear portion of the body is extended in the form of an arm 15 somewhat narrower than the body itself and located slightly above the bolt hole 12. The arm 15 is preferably offset inwardly from the body portion in order that the same may be brought in closer proximity to the face of the frame member inasmuch as the same is somewhat less in width than the head 1ª. Arranged lengthwise of the arm 15 is a series of holes 16 adapted to be used in attaching the arm 15 to the frame member in the manner about to be described.

As clearly shown in Fig. 2, the frame member 1 has a series of rivets 17, 17 located adjacent to the upper edge thereof and throughout the forward portion. The presence of rivets is commonly found in motor vehicle construction, these rivets being used for the purpose of securing the edges of the splash pan to the frame members. In order to avoid the necessity of drilling additional holes in the frame members, and hence the possibility of weakening the same, it is proposed to make use of the rivets, or rather the rivet holes, in attaching the rear end of the plate 7 to the frame. To accomplish this purpose, a link 18 is secured at its lower end to the arm 15 through the medium of one of the holes 16, and a bolt 19, said link extending vertically in an upward direction and at right angles to the arm 15 of the plate 7. Inasmuch as the location of the rivets 17 is not uniform in all makes of vehicles, one of the rivets 17 is selected, preferably one that is in vertical alinement with one of the holes 16 in the arm 15. Having selected the desired rivet, the same is removed and a bolt 20 is passed through the rivet hole and the upper end of the link 18 fastened to the frame member thereby.

In attaching the plate 7 to the vehicle frame the same would obviously be first mounted on the pivot bolt 9 and rotatably adjusted so that the forward edge or face of the flange 13 lies in a vertical plane. Having made this primary adjustment, the desired rivet hole would be selected as well as the desired hole 16 in the rearwardly extending arm 15 of the plate 7. The link 18 would then be attached at its ends to the frame member 1 and arm 15 and the several connecting members made tight. If desired, the hole at the lower end of the link 18 may be drilled after the parts have been adjusted and the exact location of the said hole accurately determined in this manner. The plate 7 is clamped in position by means of a nut 9ᵃ carried at the end of the pivot bolt, the same being removed to permit the plate to be placed on the pivot bolt. The drawings disclose a lug 21 which is struck up from the edge of the plate 7 adjacent the bolt hole, said lug carrying a set screw 22 adapted to engage the nut 9ᵃ and to hold the same from rotation.

The companion plate 8 is similar in conformation to the plate 7 just described except that it is not provided with a rearwardly extending arm, but terminates immediately behind a bolt hole 22 corresponding to the bolt hole 12 of the plate 7. The plate 8 is provided with a forward flange 23 corresponding to the flange 13 of the plate 7, said flanges 13 and 23 extending toward each other and occupying the same vertical plane. As clearly shown in Fig. 3, the flanges 13 and 23 bear a substantial abutting relation, although the distance between the end surfaces may be varied, depending on the length of the frame head to which a particular bracket is attached. Whereas the flange 13 of plate 7 is provided with the slot 14, the flange 23 has a tongue 24 adapted to engage the slot 14 in the mounted position of the bracket. The tongue 24 serves to close the vertical space separating the end surfaces of the flanges 13 and 23, the purpose of providing such a closure being hereinafter set forth more in detail. Manifestly, the plate 8 is secured to the vehicle frame in the same manner as the plate 7.

As a preferred means for connecting the bumper to the attaching bracket, a pair of U-shaped clamping plates 25, 25 are used, each of these plates having the form shown in Fig. 2, and adapted to be passed downwardly over the flanges 13 and 23 of the attaching plates and the rearwardly disposed bars 6 of the bumper. To secure the clamping plate 25 in place, the bolt 26 extends through the end portions of each clamping plate 25 below the bar 6 of the bumper and substantially in vertical alinement with the space separating the end surfaces of the flanges 13 and 23. It may be pointed out at this time that the cut out portions 13ᵃ and a similar cut out portion 23ᵃ of the flanges 13 and 23 are formed therein for the purpose of providing a space to receive the bolt 26. The function of the interfitting notch and tongue of the flanges 13 and 23 may now be pointed out. In the event that the bolt 26 becomes loose by reason of vibration in the bumper, it would be entirely possible for the clamping plate 25 to ride upwardly and become completely detached from the attaching bracket and bumper, in the event that the space separating the end surfaces of the flanges 13 and 23 was wide enough to permit the bolt 26 to move freely within the space. The presence of the tongue 14, however, provides a barrier across the space and even though the bolt should become loosened, the clamping plate 25 would not become completely detached and would continue to form a connection between the bumper and the bracket even though such connection were faulty. In other words, the parts would remain connected until the defect was noticed by the driver of the vehicle and the parts again tightened.

The construction herein disclosed for an attaching bracket provides an extremely simple and inexpensive method of attaching bumpers to vehicle frames inasmuch as elaborate fittings are not required, and the drilling of holes in the frame members is entirely avoided by the utilization of rivet holes which are already present in the frame, and hence may properly serve as connecting means by the replacement of the rivet by a bolt.

Although we have described and illustrated a preferred embodiment of the invention, it is to be understood that the details of construction may be variously modified without departing from the spirit of the invention or as more specifically pointed out in the appended claims.

We claim as our invention:

1. An attachment bracket for bumpers comprising a plate adapted to be clamped to a vehicle frame member and having an arm adapted to extend rearwardly along said frame member, and a series of longitudinally spaced holes in said arm, and a link adapted for connection with one of said holes and with said frame member.

2. An attachment bracket for bumpers comprising a plate adapted to be clamped to the side of a vehicle frame member by means of the spring pivot bolt thereof, said plate having a rearwardly extending arm and a series of longitudinally spaced holes therein and a link adapted to be connected at one end to a hole in said frame member and at its other end to one of said holes in said arm and substantially in vertical alinement with said hole in the frame member.

3. An attachment bracket for bumpers comprising a plate adapted to be clamped to the side of a vehicle frame member, said plate having a centrally located hole through which the spring pivot bolt of the vehicle frame extends and a rearwardly extending arm having a series of holes therein, and a link connecting the arm to the vehicle frame, said link being attached by means of one of the holes in said arm, and a hole in said frame member substantially in vertical alinement therewith.

4. An attachment bracket for bumpers comprising a plate adapted to be clamped to a vehicle frame member and having an integral arm adapted to extend rearwardly along said frame member, and a series of longitudinally spaced holes in said arm, and a link extending transversely to the arm of said plate and adapted for connection with one of said holes and with a hole in said frame member normally serving to receive a rivet.

5. An attachment bracket for bumpers comprising a plate adapted to be clamped to the side of a vehicle frame member by means of the spring pivot bolt thereof, said plate having a rearwardly extending arm and a series of longitudinally spaced holes therein and a link adapted to be connected to said plate by means of one of said holes in said arm and with a hole of the frame member in vertical alinement therewith, said hole in the frame member being one of several serving to retain a rivet.

6. An attachment bracket for bumpers, comprising a pair of companion plates adapted to be clamped on opposite sides of a vehicle frame member, said plates having transverse flanges at their front ends extending toward each other and provided with an interlocking notch and tongue at their adjacent edges.

7. An attachment bracket for bumpers, comprising a pair of companion plates adapted to be clamped on opposite sides of a vehicle frame member, means for securing the bracket in clamped position, said plates having transverse flanges at their forward ends and extending toward each other, a clamp for fastening a bumper flatwise against said flanges, there being formed an interlocking notch and tongue at the opposed edges of said flanges serving to close the vertical space between said edges.

In witness whereof, we hereunto subscribe our names this 29th day of October, A. D. 1920.

WILLIAM G. PANCOAST.
WILLIAM J. GROTENHUIS.